United States Patent [19]

McClelland

[11] Patent Number: 5,003,505
[45] Date of Patent: Mar. 26, 1991

[54] TOUCHSCREEN/KEYBOARD SCANNER

[75] Inventor: Scott R. McClelland, Loomis, Calif.

[73] Assignee: Hewlett-Packard Company, Palo Alto, Calif.

[21] Appl. No.: 607,541

[22] Filed: May 7, 1984

[51] Int. Cl.⁵ .............................................. G06Z 13/00
[52] U.S. Cl. .............................. 364/900; 364/927.92; 364/927.99; 364/942
[58] Field of Search ... 364/200 MS File, 900 MS File; 340/365 R, 365 S, 365 A, 365 P, 365 VL, 711, 712, 706; 235/145 R; 200/5 R, 159 B; 250/221, 551; 178/18

[56] References Cited

U.S. PATENT DOCUMENTS

| | | | |
|---|---|---|---|
| 3,346,853 | 10/1967 | Koster et al. | 340/711 |
| 3,755,785 | 8/1973 | Kirk | 364/200 |
| 4,016,548 | 4/1977 | Law et al. | 364/200 |
| 4,048,632 | 9/1977 | Spence | 340/762 |
| 4,078,257 | 3/1978 | Bagley | 364/900 |
| 4,264,954 | 4/1981 | Briggs et al. | 364/200 |
| 4,281,315 | 7/1981 | Bauer et al. | 364/200 |
| 4,374,381 | 2/1983 | Ng | 340/712 |
| 4,459,476 | 7/1984 | Weissmueller | 340/365 P |

Primary Examiner—David Y. Eng
Attorney, Agent, or Firm—Roland I. Griffin; Alan H. Haggard

[57] ABSTRACT

A computing system controlling is presented which controls input from both a keyboard and a touchscreen. Photo detectors placed in rows and columns along the edge of the touchscreen detect light beams directed across a surface on the touchscreen. The touchscreen indicates to the computing system controller addresses of which detectors do not detect light beams because an object is blocking the light beam path. The computing system controller calculates an average for the row addresses of detectors not detecting light beams, and an average for the column addresses of detectors not detecting light beams. The average is then sent to the host program.

5 Claims, 5 Drawing Sheets

TO FIG 4B

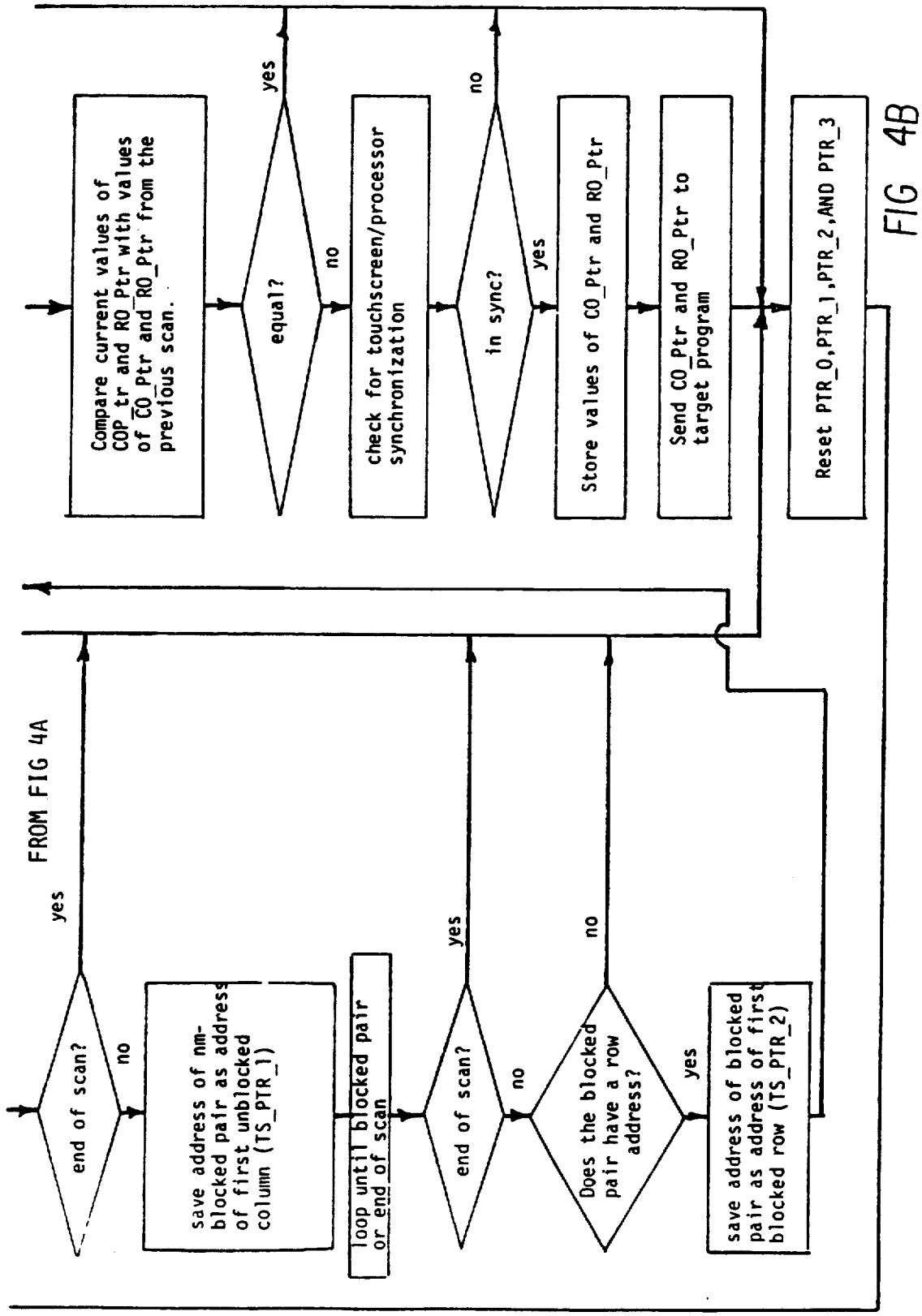

TOUCHSCREEN/KEYBOARD SCANNER

BACKGROUND

The present invention relates to a computing system which employs a touchscreen and a keyboard. This case is a companion case to pending patent applications No. 533,384 filed Sept. 16, 1983 by Thomas Earl Kilbourn and Scott Robert McClelland.

In prior art uses of touchscreens, see for example U.S. Pat. Nos. 3,764,813, 3,775,560 and 3,860,754, data provided by touchscreen circuits has been processed in a data path separate from data provided by keyboards. Positional data from a touchscreen has been translated by host programs separately from the programs which process data from a keyboard.

SUMMARY OF THE INVENTION

In accordance with a preferred embodiment of the present invention a computing system controller is presented which controls input from both a keyboard and a touchscreen circuit. The touchscreen circuit triggers and detects infrared light beams on a touchscreen. The light beams are arranged to travel horizontally in rows and vertically in columns across the touchscreen. Locations of blocked light beams in adjacent columns and locations of blocked light beams in adjacent rows are averaged to calculate the central location of an object touching the touchscreen. Coordinates of the central location are sent to a host program.

BRIEF DESCRIPTION OF THE DRAWINGS

FIGS. 4a and 4b show a flowchart of a touchscreen scanning program in accordance with the preferred embodiment of the present invention.

DESCRIPTION OF THE PREFERRED EMBODIMENT

Figure 1:
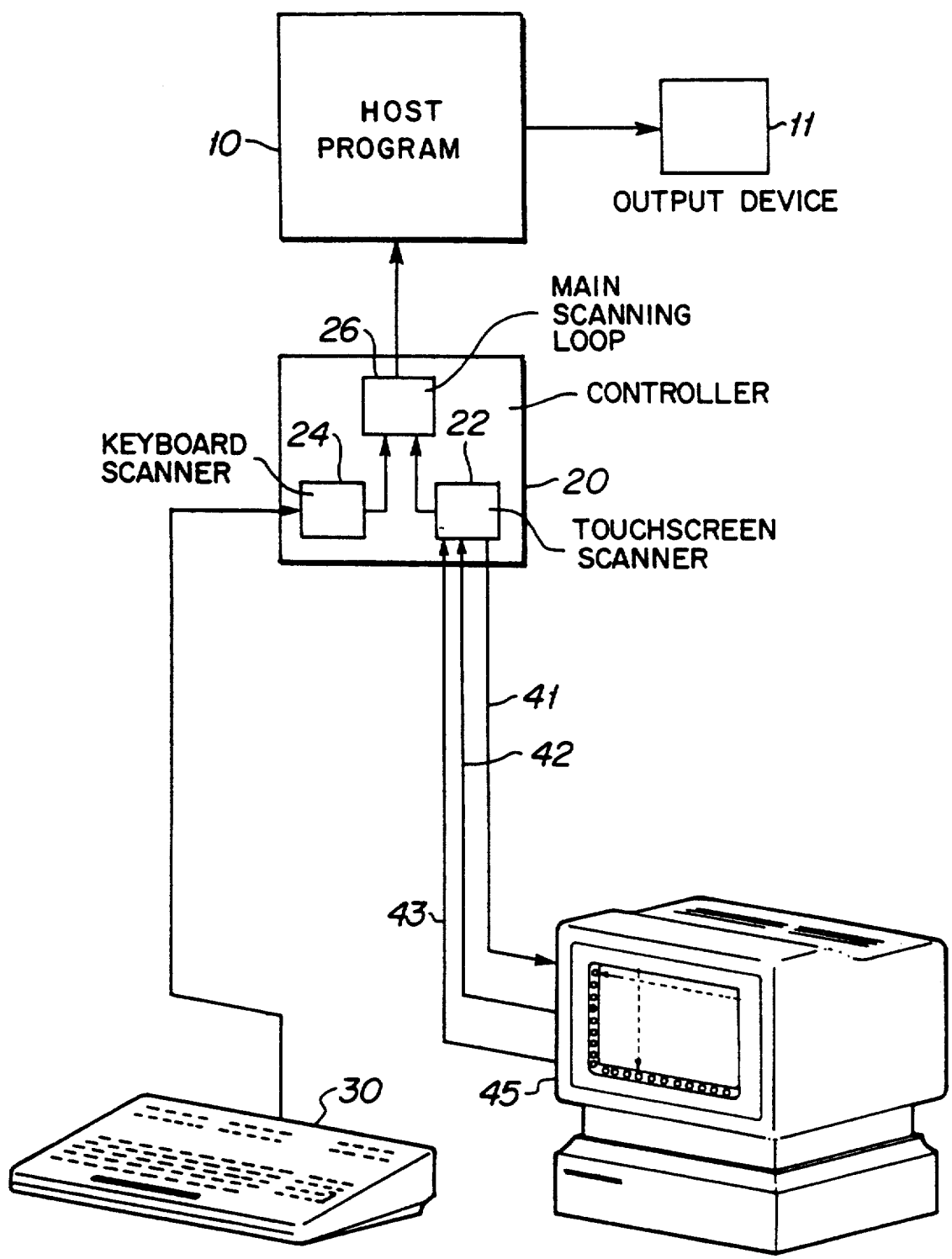
FIG. 1 shows a computer system in accordance with the preferred embodiment of the present invention.

FIG. 1 shows a data input path from a keyboard 30 and a touchscreen 45 on a terminal 40 to a host program 10 through a touchscreen/keyboard controller 20. Host program 10 communicates with an operator through an output device 11. Output device 11 may be, for instance, a printer or a display screen. The interface between controller 20 and touchscreen 45 comprises only 3 wires, a synchronization wire 43, a data wire 42 and a clock wire 41. Controller 20, e.g., an 8041A microcontroller manufactured by Intel, contains in ROM, software modules which include a keyboard scanner 24, a touchscreen scanner 22 and a main scanning loop 26.

Figure 2:
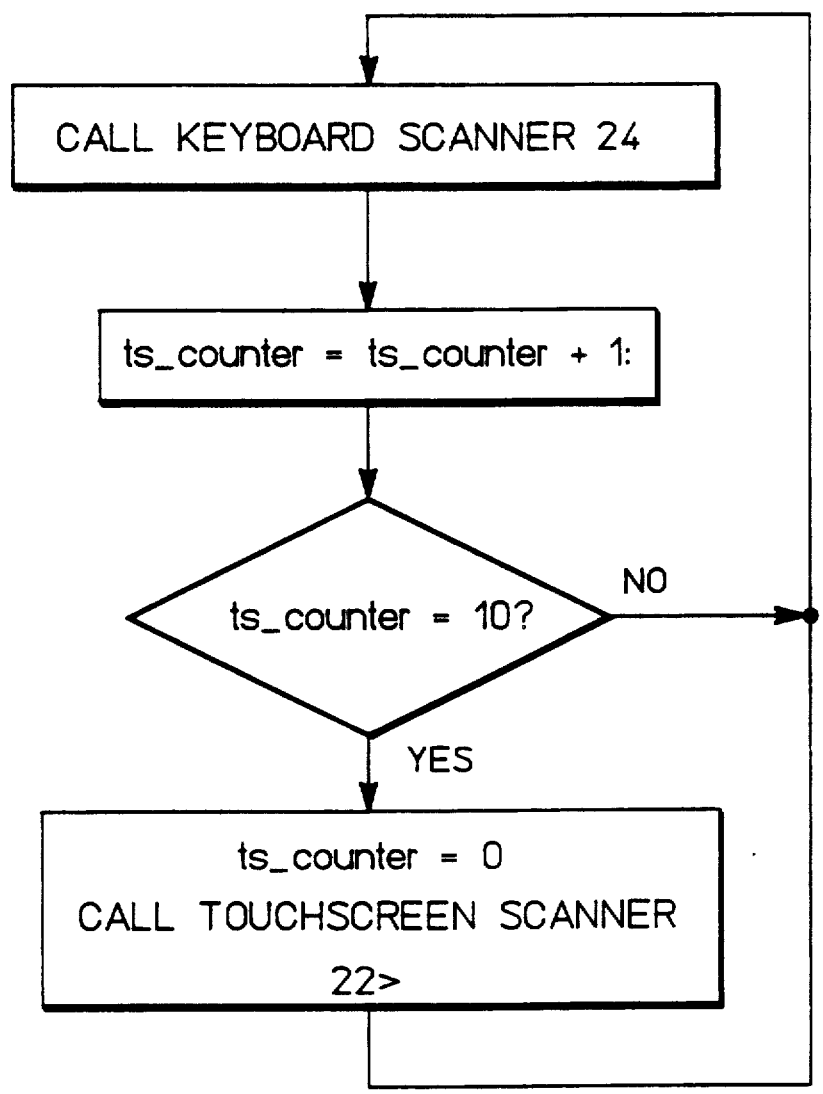
FIG. 2 shows a flowchart of a computer program in accordance with the preferred embodiment of the present invention.

Controller 20 cycles continually in main scanning loop 26 which calls keyboard scanner 24 and touchscreen scanner 22. In order to keep the keyboard scanning rate up and to provide a sufficient delay for touchscreen data to settle, a counter (ts_counter) is incremented during each cycle of the main scanning loop. When ts_counter reaches a terminal count (e.g. 10) touchscreen scanner 22 is called. FIG. 2 shows a flowchart of main scanning loop 26.

Figure 3:
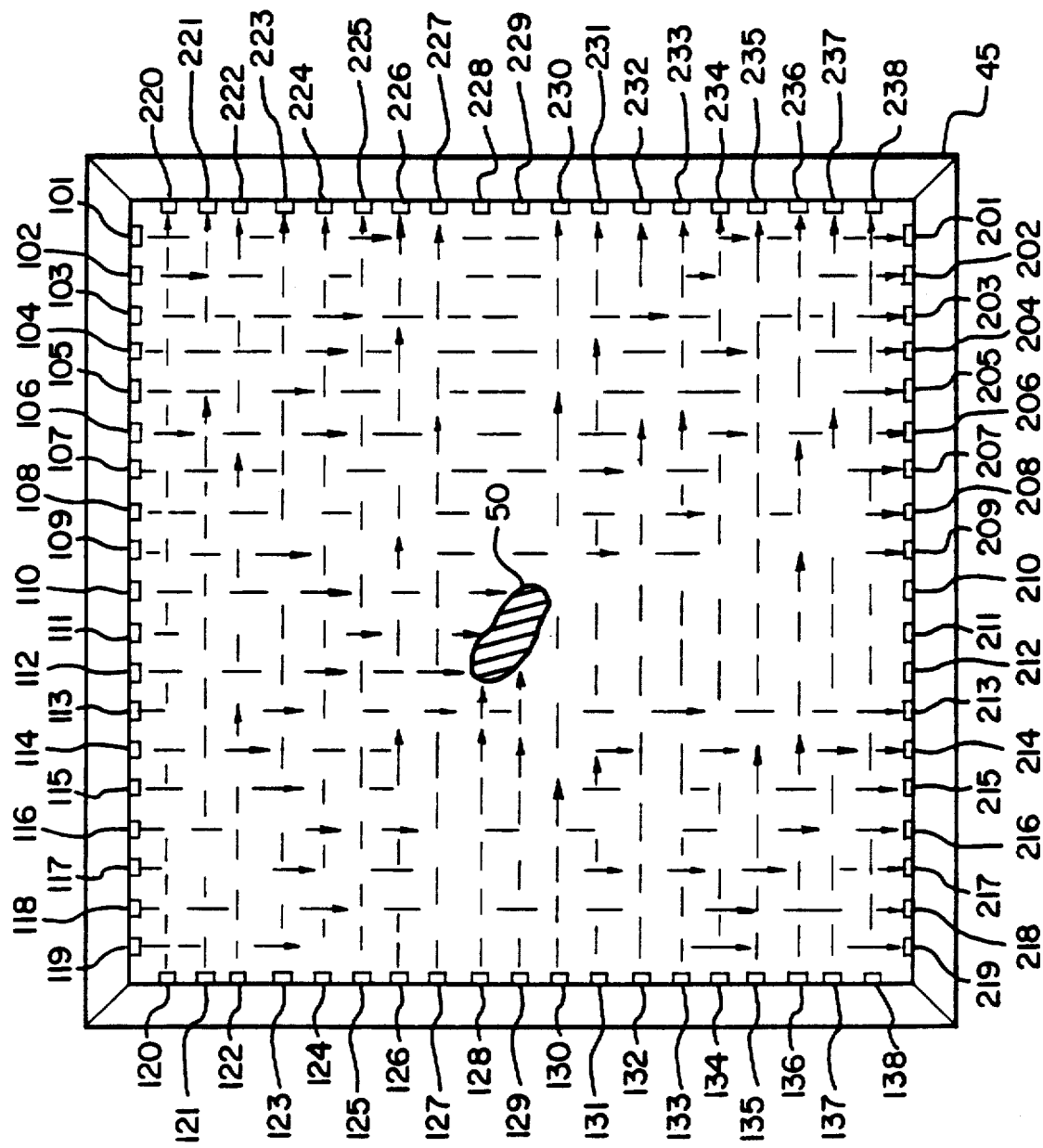
FIG. 3 shows a touchscreen in accordance with the preferred embodiment of the present invention.

FIG. 3 shows touchscreen 45 with a blocked area 50. Photo beam paths, represented by dotted lines and arrows, are traversed by photo beams, e.g. infrared light beams, emitted from photo beam emitters 101-138 and detected by photo beam detectors 201-238. As can be seen from the diagram, blocked area 50 prevents photo beams from being detected by photo beam detectors 210-212 and photo beam detectors 228-229. During a scan cycle touchscreen 45 (see Kilbourn et. al cited above) will report detection of photo beams at photo beam detectors 201-209, 213-227, and 230-238. Touchscreen 45 will report blocked photo beams at photo beam detectors 210-212 and 228-229. A location representing the center of blocked area 50 will be reported to host program 10. In the case of blocked area 50 host program 10 would receive data indicating the horizontal position on the screen equivalent to the position of photo beam emitter/detector pair 111/211 and indicating the vertical position on the screen equivalent to a point midway between photo beam emitter/detector pair 128/228 and photo beam emitter/detector pair 129/229.

When main scanning loop 26 calls touchscreen scanner 22, a single touchscreen photo beam is checked to determine whether it is blocked or unblocked. If touchscreen scanner 22 is not at the end of a scan touchscreen scanner 22 stores its state and returns to the main scanning loop 26. Next time the touchscreen scanner 22 is called it will start to run in the state stored.

Touchscreen 22 first checks for blocked photo beams in columns and then it checks for blocked photo beams in rows. The last column address is a "dummy" meaning that touchscreen 45 always reports that column address as unblocked. This is present so that when the last columns are blocked, touchscreen scanner will become aware that it has finished scanning the columns and is about to start scanning rows.

When noncontiguous blocked photo beams are detected by detectors organized in columns, or when noncontiguous blocked photo beams are detected by detectors organized in rows touchscreen scanner 22 clocks to the end of the scan and starts over. Thus if an operator touches the screen in two noncontiguous places simultaneously, touchscreen scanner 22 will not report anything to host program 10.

If at the end of a touchscreen scan cycle a single or a plurality of contiguous detectors in a row and a single or plurality of contiguous detectors in a column report blocked photo beams, touchscreen scanner 22 checks a synchronization signal to determine whether touchscreen scanner 22 is synchronized with touchscreen 45 (see Kilbourn et. al. referenced above). If they are out of synchronization, touchscreen scanner 22 resynchronizes itself with touchscreen 45 and sets up for a new scan cycle without reporting values to host program 10. If they are synchronized, controller 20 calculates an approximate center position of the object on the touchscreen by averaging the row detectors reporting blocked photo beams to calculate an average row position (RO_Ptr) and averaging the column detectors to calculate an average column position (CO_Ptr). In general, in any row or in any column, if an odd number of beams are blocked, the position reported will be for the centermost blocked beam. If an even number of beams are blocked, the position reported will be for a point halfway between the two centermost blocked beams.

Once RO_Ptr and CO_Ptr are calculated, controller 20 compares these values with values of CO_Ptr and RO_Ptr from the prior scan cycles. If either RO_Ptr or CO_Ptr differs from the prior scan values or if there were no blocked beams in the prior scan cycle, the new CO_Ptr and RO_Ptr are reported to host program 10. This scheme minimizes the reporting of redundant data to host program 10.

If at the end of a touchscreen scan cycle there is no blocked photo beams touchscreen scanner 22 checks to see if the prior scan reported a blocked area. If it did, a touch release flag (R_flag) is sent to host program 10. R_flag indicates to host program 10 when an operator removes an object from the photo beam paths on the touchscreen and facilitates host program 10's ability to retain the position of the last touched area.

Figure 4A:
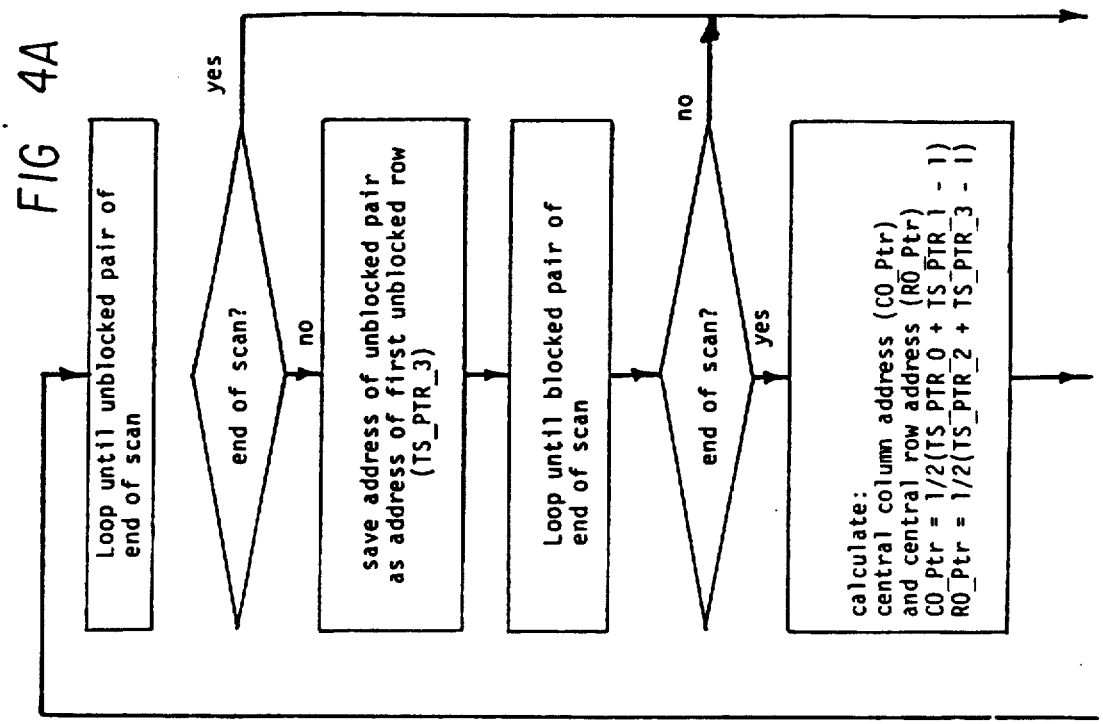
Figure 4A:
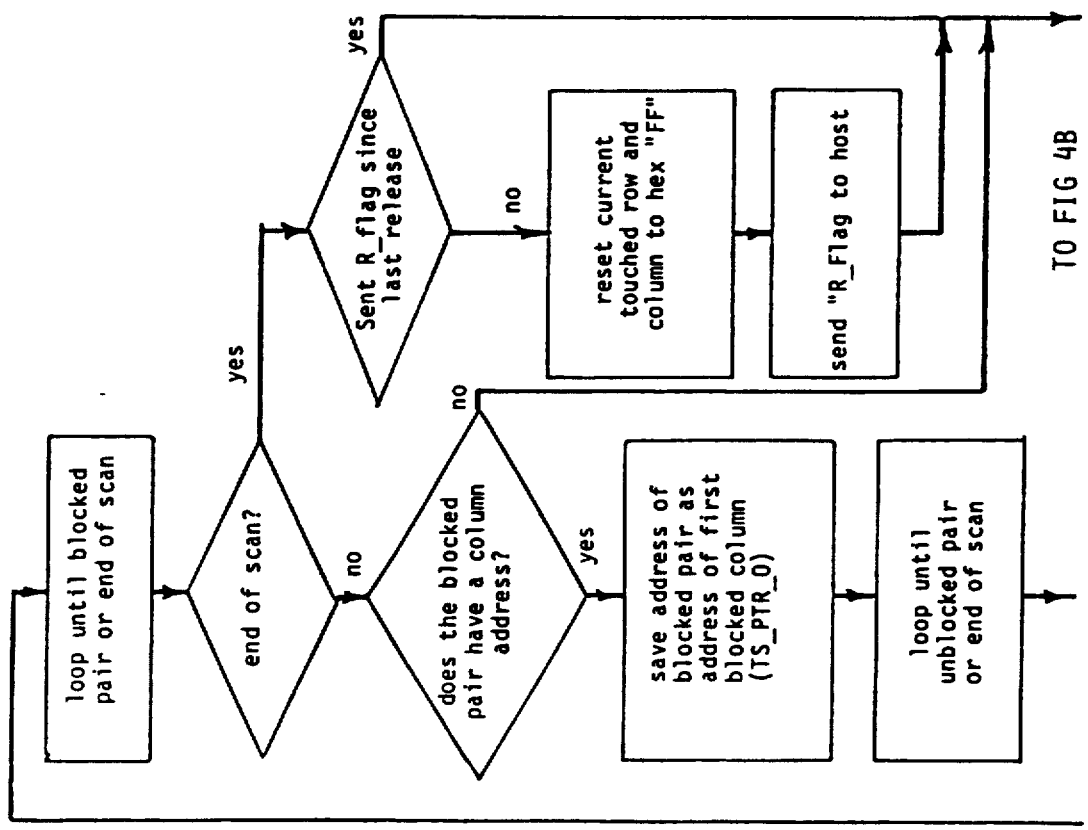

FIG. 4 shows a flowchart for touchscreen scanner 22.

What is claimed is:

1. A computing system having a device for receiving data from an operator, the device comprising:

a touchscreen means for receiving data from the operator which was communicated by the operator touching the touchscreen means, wherein the touchscreen means includes rows and columns and the touchscreen means separately scans a row to determine if the operator is touching the touchscreen means within that row, and the touchscreen means separately scans a column to determine if the operator is touching the touchscreen means within that column;

a keyboard input means for receiving data from the operator which was communicated by the operator touching the keyboard input means; and a software program including a main routine, a keyboard scanning subroutine and a touchscreen scanning subroutine, wherein the main routine calls the keyboard scanning subroutine and the touchscreen scanning subroutine so that after the main routine calls the touchscreen subroutine, the keyboard scanning subroutine is called at least once before the touchscreen subroutine is called again, and at any one time that the touchscreen subroutine is called, the touchscreen means scans a subset of the columns and the rows, but does not scan all the columns and the rows.

2. A computing system as in claim 1 wherein each time the main routine calls the touchscreen scanning subroutine, the touchscreen at most scans one row or one column.

3. A computing system as in claim 1 wherein the touchscreen scanning subroutine includes locating means for determining within which rows and which columns the operator is touching the touchscreen means.

4. A computing system as in claim 1 wherein the device additionally comprises means, responsive to the touchscreen scanning subroutine, for, upon completion of the scanning of all the rows and all the columns, averaging the columns within which the operator is touching the touchscreen means to produce a column average number and averaging the rows within which the operator is touching the touchscreen means to produce a row average number.

5. A computing system as in claim 1 wherein the device additionally comprises means responsive to the touchscreen scanning subroutine for setting a flag when it determines that the operator ceases to touch the touchscreen means.

* * * * *